(12) United States Patent
Ezrielev et al.

(10) Patent No.: US 12,483,542 B2
(45) Date of Patent: *Nov. 25, 2025

(54) GRADUAL ACCESS RECOVERY IN TIME AND AUTHORIZATION

(71) Applicant: Dell Products L.P., Round Rock, TX (US)

(72) Inventors: Ofir Ezrielev, Be'er Sheba (IL); Lee Serfaty, Be'er Sheba (IL); Yehiel Zohar, Sderot (IL)

(73) Assignee: Dell Products L.P., Round Rock, TX (US)

( * ) Notice: Subject to any disclaimer, the term of this patent is extended or adjusted under 35 U.S.C. 154(b) by 136 days.

This patent is subject to a terminal disclaimer.

(21) Appl. No.: 18/308,795

(22) Filed: Apr. 28, 2023

(65) Prior Publication Data

US 2024/0364677 A1 Oct. 31, 2024

(51) Int. Cl.
*H04L 9/40* (2022.01)

(52) U.S. Cl.
CPC ...... *H04L 63/0823* (2013.01); *H04L 63/0884* (2013.01)

(58) Field of Classification Search
CPC ............ H04L 63/0823; H04L 63/0884
See application file for complete search history.

(56) References Cited

U.S. PATENT DOCUMENTS

| | | |
|---|---|---|
| 6,748,084 B1 | 6/2004 | Gau et al. |
| 8,181,016 B1 | 5/2012 | Borgia et al. |
| 9,652,617 B1 | 5/2017 | Evans et al. |
| 10,412,097 B1 | 9/2019 | Banshats et al. |
| 10,601,816 B1 * | 3/2020 | Stickle ............ H04W 4/08 |
| 10,903,991 B1 | 1/2021 | Craige et al. |
| 11,057,210 B1 | 7/2021 | Sierra et al. |
| 11,722,491 B1 | 8/2023 | Al-Rashid et al. |
| 11,914,696 B1 | 2/2024 | Saxe et al. |
| 12,154,047 B1 | 11/2024 | Govindan et al. |
| 12,299,173 B2 * | 5/2025 | O'Neil ............ G06F 21/6254 |
| 2002/0184493 A1 | 12/2002 | Rees |
| 2003/0159032 A1 | 8/2003 | Gerck |
| 2007/0223702 A1 | 9/2007 | Tengler et al. |
| 2009/0283597 A1 | 11/2009 | Charles et al. |

(Continued)

FOREIGN PATENT DOCUMENTS

WO 2016/205886 A1 12/2016

OTHER PUBLICATIONS

Gunther Schiefer et al., "Security in a Distributed Key Management Approach," 2017, pp. 816-821. (Year: 2017).

(Continued)

*Primary Examiner* — Mohammad A Siddiqi
(74) *Attorney, Agent, or Firm* — Workman Nydegger

(57) ABSTRACT

Reinstating access to a system of an admin whose certificate is invalid or expired is disclosed. A requestor may send a request for reinstatement to tenant admins. The initiating tenant admin may initiate a voting operation to reinstate the requestor as an admin of a computing system. During the voting operation, multiple control points are implemented. At each control point, a key of the requestor is verified. The voting operation only proceeds when the key verification is successful. The voting operation is a gradual access recovery process where required keys are revealed over time and in a specific sequence.

20 Claims, 4 Drawing Sheets

(56) References Cited

U.S. PATENT DOCUMENTS

| | | | |
|---|---|---|---|
| 2011/0022883 A1* | 1/2011 | Hansen | H04L 9/085 713/168 |
| 2012/0016723 A1 | 1/2012 | Valles et al. | |
| 2014/0195546 A1 | 7/2014 | Ren | |
| 2016/0140335 A1 | 5/2016 | Proulx et al. | |
| 2016/0277411 A1 | 9/2016 | Dani et al. | |
| 2016/0350874 A1* | 12/2016 | Santos | G06Q 10/10 |
| 2018/0032750 A1 | 2/2018 | Hammel | |
| 2018/0241747 A1 | 8/2018 | Tanaka et al. | |
| 2019/0305938 A1 | 10/2019 | Sandberg-Maitland et al. | |
| 2020/0036707 A1* | 1/2020 | Callahan | H04L 67/53 |
| 2020/0242232 A1* | 7/2020 | Machani | H04L 63/0884 |
| 2020/0351083 A1 | 11/2020 | Bartolucci et al. | |
| 2020/0382327 A1 | 12/2020 | Mokhasi et al. | |
| 2020/0412542 A1 | 12/2020 | Bartolucci et al. | |
| 2021/0006418 A1 | 1/2021 | Wei | |
| 2021/0064759 A1 | 3/2021 | Lomonaco et al. | |
| 2021/0081520 A1 | 3/2021 | Howarth et al. | |
| 2021/0133359 A1* | 5/2021 | Liu | G06F 21/64 |
| 2021/0182423 A1* | 6/2021 | Padmanabhan | H04L 9/3271 |
| 2021/0258298 A1 | 8/2021 | Pattar et al. | |
| 2021/0289033 A1 | 9/2021 | Ahuja | |
| 2022/0076253 A1 | 3/2022 | Chaum | |
| 2022/0076518 A1 | 3/2022 | Byun | |
| 2022/0182239 A1 | 6/2022 | Hassanzadeh et al. | |
| 2022/0271933 A1 | 8/2022 | Chen et al. | |
| 2022/0342980 A1 | 10/2022 | Myers | |
| 2023/0401307 A1* | 12/2023 | Pop | G06F 8/65 |
| 2024/0086550 A1 | 3/2024 | Tamir et al. | |
| 2024/0154988 A1 | 5/2024 | Yates | |
| 2024/0163305 A1* | 5/2024 | Fridman | H04L 63/1433 |
| 2024/0171589 A1* | 5/2024 | Ezrielev | H04L 63/0823 |
| 2024/0171602 A1 | 5/2024 | Ezrielev et al. | |
| 2024/0305643 A1* | 9/2024 | Ezrielev | H04L 63/20 |
| 2024/0356740 A1* | 10/2024 | Ezrielev | H04L 9/085 |
| 2024/0356921 A1* | 10/2024 | Ezrielev | G06F 21/45 |
| 2024/0364541 A1* | 10/2024 | Ezrielev | H04L 63/104 |
| 2024/0380585 A1 | 11/2024 | Arora et al. | |

OTHER PUBLICATIONS

Mohammad Faraji et al., "Identity Access Management for Multi-tier Cloud Infrastructures," 2014, pp. 1-9 (Year: 2014).

* cited by examiner

GRADUAL ACCESS RECOVERY IN TIME AND AUTHORIZATION

RELATED APPLICATION

This application is related to U.S. application Ser. No. 18/057,287 filed Nov. 21, 2022, and U.S. application Ser. No. 18/181,086 filed Mar. 9, 2023, which applications are incorporated by reference in its entirety.

FIELD OF THE INVENTION

Embodiments of the present invention generally relate to identity and access control and management. More particularly, at least some embodiments of the invention relate to systems, hardware, software, computer-readable media, and methods for recovering access, including administrator access, to identity and access management systems.

BACKGROUND

Computing environments and systems may include a mixture of on-premise systems and cloud or edge-based systems. As these systems operate, data in these systems may originate at various locations and may be transmitted from one location to another location. For example, an entity may move data from on-premise locations to cloud or edge locations and vice versa.

It is beneficial and important to protect the data in these systems and to protect or control access to the data. To protect and/or control access to data, an entity may employ various strategies such as a zero-trust strategy. In a zero-trust strategy, no user, device, or network traffic is trusted by default. This type of strategy helps eliminate or at least reduce various security vulnerabilities.

One aspect of these data protection strategies relates to user authentication and access control. A common way to protect data or control access is to use basic username/password authentication. This type of authentication, however, may not provide sufficient long-term security. Certificate based authentication and access control is viewed as more secure.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
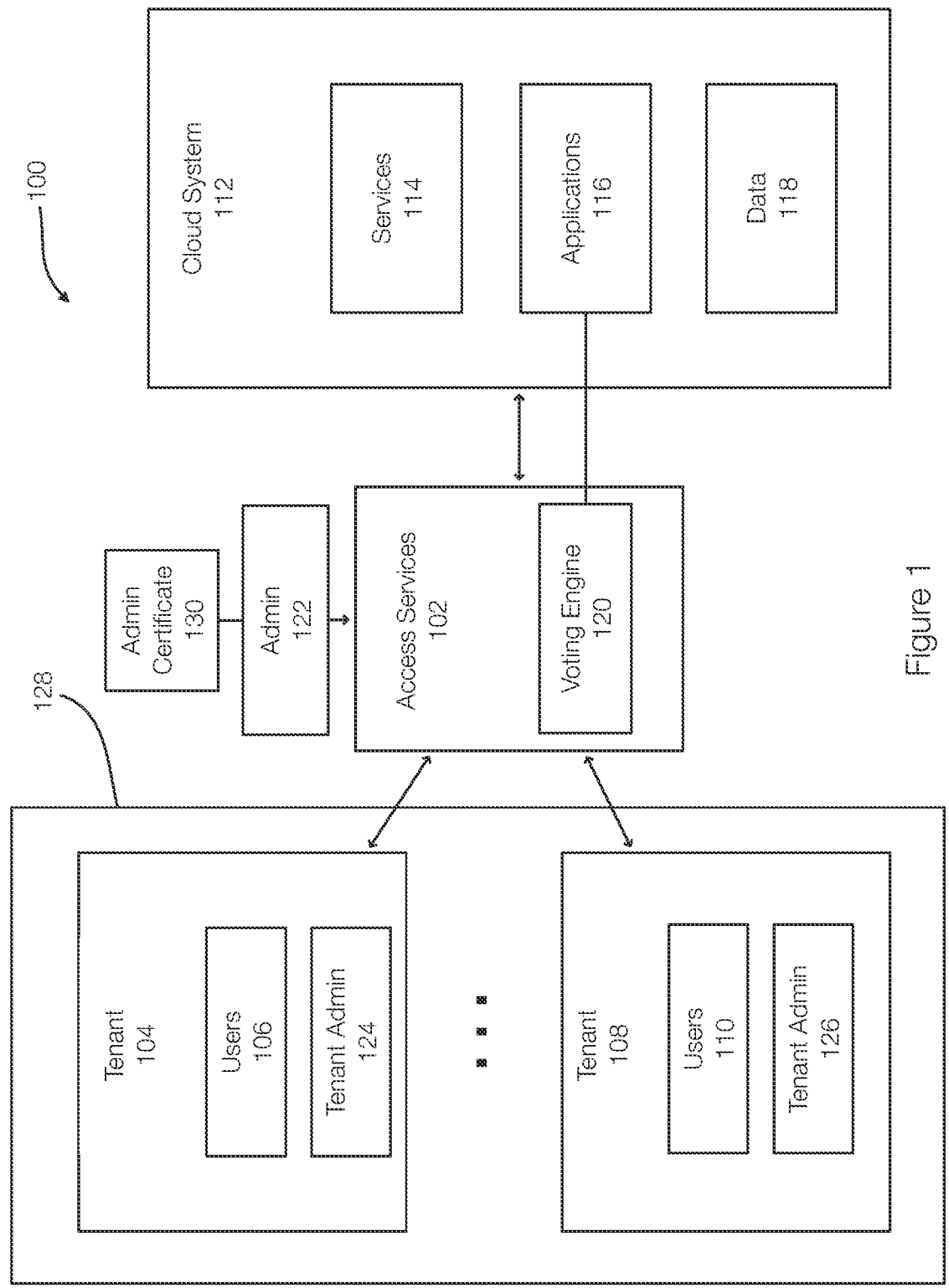
FIG. 1 discloses aspects of an environment that allows a user to request reinstatement as an admin when their certificate is not valid or has expired.

Embodiments of the present invention generally relate to identity and access management. More particularly, at least some embodiments of the invention relate to systems, hardware, software, computer-readable media, and methods for restoring access to an administrator (admin) or other user that has lost access to a system.

More specifically, example embodiments of the invention relate to restoring access/control to administrators of identity and access management systems or services (referred to herein as access services). Common/Customer Identity and Access Management (CIAM) is an example of access services. Access services may control or manage client/user authentication, control data access, or the like. Access services ensure that customers can receive consistent configurations and capabilities across their application deployments in computing environments.

In a multi-tenant environment, access services may be managed by an administrator (admin). Each tenant is managed by a tenant administrator (a tenant admin). These admins may also be associated with specific roles or permissions. An admin of the access services, for example, may have roles or permissions that allow the admin to perform operations or determine settings that impact multiple tenants. A tenant admin is limited to roles and permissions of a specific tenant. The admins and the tenant admins represent different admin classes that have different privileges in a computing environment.

By way of example, access services may perform or include basic authentication such as username/password or perform certificate-based authentication using mTLS (mutual Transport Layer Security) via a REST API (Representational State Transfer Application Programming Interface). Authentication performed using mTLS is generally more secure than basic authentication.

During an mTLS handshake, the certificate of the admin is validated against the trusted root CA (Certificate Authority). Invalid certificates (CA or server) may cause the mTLS handshake process to fail. Consequently, the requested access may fail or be denied. This may lead to a scenario where the admin does not have access to the access services. For example, an admin may attempt to access the access services and if the admin's certificate has expired, access will be denied or fail.

Embodiments of the invention relate to restoring access to the admin and, more specifically, to restoring access to the admin when the admin's certificate is invalid (e.g., expired). This may include installing a new certificate for the admin in the access services.

Embodiments of the invention are not limited to restoring or reinstating an admin but may also relate to determining whether actions or operations in a computing system are allowed or permitted. For example, operations that are determined to be significant as important may be subject to embodiments of the invention. For example, an operation to delete data or to change authentication, granting a tenant admin special access, or the like may be operations that cannot be performed absent a voting operation. This ensures that multiple admins agree with the proposed operation.

As previously stated, access services may authenticate clients using mTLS (mTLS handshake) via a REST API. This type of authentication ensures that the clients or users at each end of a network connection are who they claim to be by verifying that they both have the correct private key.

The information included in their respective TLS (or other) certificates provides additional verification.

More specifically, when initiating access services (e.g., registering a new user) or when preparing to implement TLS, a public/private key is generated for a user. The private key is private to the user and should be kept secret. The public key may be included in the certificate that may be shared with others. Once the certificate is generated and signed by a certificate authority (CA), the certificate may be installed. Each user/device is typically associated with a role, permissions, and/or a certificate. These certificates are used to authenticate identity.

During the TLS handshake operation, a client encrypts (and/or signs) data using the public key included in a server's certificate. The server will only be able to decrypt the data if the server has the corresponding private key. This process may be performed in both directions from client to server and from server to client. This allows the client to confirm that the server is who the server claims to be and allows the server to confirm that the client is who the client claims to be. This process requires the client and the server to use their respective private keys.

Trust in the certificate-based authentication is further improved using certificate authorities. The certificate authority is, in effect, a trusted third party. The certificate may include data that has been encrypted with the certificate authority's private key. Alternatively, the certificate has been signed by the certificate authority's private key and can be decrypted with the certificate authority's public key. This process may be further adapted to include root and intermediate certificate authorities. Processing a certificate that is signed by a trusted certificate authority provides further trust in the identity of the client and in the identity of the server.

A TLS certificate is a data file that includes, by way of example, information for verifying a server's identity or a device's identity and includes the public key, a statement of who issued the certificate (e.g., the CA), and the certificate's expiration date.

If the certificate of an admin (e.g., the admin of the access services) is expired or otherwise invalid, embodiments of the invention relate to restoring access for the admin and allowing a new certificate for the admin to be generated and/or installed.

In example embodiments of the invention, a tenant admin may receive a request from a requestor, who may be a locked-out admin. The tenant admin becomes an initiating admin and may initiate a voting operation that allows other tenant admins and/or applications to vote on whether to reinstate the requestor as the admin. During the voting operation, the voting entities may each perform identity tests prior to voting.

In one example, if the vote is affirmative, the initiating tenant admin may be given the authority to install a new certificate for the requestor such that the requestor is reinstated as the admin. This may be a sensitive action and embodiments of the invention relate to a gradual access recovery process that is limited in terms of time and/or authority. This helps prevent the temporary authority granted to the tenant admin from being abused.

This provides or creates an additional layer of control. More specifically, the requestor (after/during a voting operation to reinstate the requestor as the admin) will provide a collection of secrets (e.g., keys) during the reinstatement process. The keys may be provided at different times and may be provided when requested. Various steps or acts of the voting operation may require one of the keys to be verified. For example, a first key may be needed to initiate the vote. A second key may be needed to obtain the necessary permission to install the certificate or perform other action after a successful vote. A third key may be needed to actually perform the change (e.g., install the certificate). These keys are configured as single-use keys that are invalid after being used.

Because the keys are required at different stages of the voting operation or reinstatement process, the keys are gradually revealed. Because the keys are also single use keys, the process cannot be repeated and a single key cannot be successfully used to install a certificate.

In one example, the operation of providing keys at various stages (control points) is performed during a single secure session such that an external attempt to use the key outside of the session will fail. Even if an attacker or imposter manages to use one of the keys (e.g., a man-in-the-middle attack), the requestor can inform the tenant admin and the voting operation can be restarted. The requestor may also verify return values at each stage of the voting or reinstatement operation to protect against misuse and/or attacks.

FIG. 1 discloses aspects of a multi-tenant system including or associated with access services. The multi-tenant system 100 may include on-premise, edge, and/or cloud computing systems and machines. FIG. 1 illustrates tenants 128, represented by tenants 104 and 108, of a cloud system 112. The cloud system 112 may include or provide, by way of example only, services 114, applications 116, and data 118 (or data storage) to the tenants 128.

Each of the tenants 128 may use the at least some of the same services 114 and applications 116 (and may use the same instance of an application). The data 118, which may be stored in storage devices, may include the data of each of the tenants 128. However, the cloud system 112 is configured to keep data of the tenant 104 independent and separate from the data of the tenant 108. The data of any particular tenant is never available or accessible by any other tenant unless consent is provided.

The tenant 104 may include users 106, which also represents devices that may access the cloud system 112 (e.g., client devices) and a tenant admin 124, which may also include or be associated with a tenant admin device. The tenant 108 may similarly include users 110 and a tenant admin 126.

The access services 102 is configured to control and manage identity and access of the tenants 128 to the cloud system 112. This access services 102 may include authentication, access control, customer registration, account management, consent, management, directory services, and the like or combination thereof.

The access services 102 is controlled or managed by an admin 122 (or multiple admins). The admin 122 (as well as the tenant admins 124 and 126 and the users 106 and 110) may also be registered with the access services 102 and may be associated with roles, privileges, or the like. Devices may be similarly registered. Thus, the admin 122 (as well as the tenant admins 126 and 126 and users 106 and 110) may be able to perform certain operations from certain devices. Alternatively, the admin 122 (or other tenant admin or user) may be able to perform their roles and permissions from any device as long as properly authenticated.

In this example, the users 106, 110, the tenant admins 124, 126, and the admin 122 are each associated with a certificate. The admin certificate 130 of the admin 122 is illustrated in FIG. 1. The certificates are typically used, including in a zero-trust strategy, whenever access is requested or when any operation is performed. In one example, the certificates may be used for authentication while roles or permissions may be used to control access after authentication. As previously stated, in zero-trust, exercising a role or a permission may still be subject to authentication.

In one example, the admin certificate 130 may expire or be invalid for other reasons. This prevents the admin 122 from accessing the access services 102 and thus may have an impact on the operation of the access services 102.

The access services 102 is configured with a voting engine 120 that may be invoked or perform a voting operation in order to reinstate the admin 122 and install a new certificate for the admin 122. Thus, the voting engine 120 is configured to reinstate the admin 122 in the event that the admin certificate 130 expires or is invalid for other reasons.

If the admin 122 is unable to access the access services 102, the admin 122 may attempt to reinstate its certificate (e.g., have a new certificate installed). This may be achieved by performing a voting operation. Initially, the admin 122 (now an unknown requestor when locked-out) may contact one or more of the tenant admins 124 and 126 to notify them that the admin 122 is locked out. The admin 122 may send a new valid certificate to those clients (the tenant admins 124 and 126) at the same time or at another time during the voting and/or reinstatement operation. The request from the admin 122 should inform the tenant admins 124 and 126 of the admin's identity. The request may be sent to a single tenant admin.

The tenant admin that receives the request may require a secret or key from the requestor in order to initiate the voting operation. Thus, initiating the voting operation is an example of a first control point. If the requestor is unable to provide the key, the voting process is not initiated. If the first key is provided and verified, the voting process is initiated and eventually a voting result is obtained. If the vote is successful or affirmative (e.g., the vote is yes to proceed), the initiating tenant admin may require a second key from the requestor at this second control point. Use of this second key allows the initiating tenant admin to receive the permission needed to install the new certificate. When the initiating tenant admin is ready to install the certificate, a third key is required from the requestor for a third control point.

If the requestor is unable to provide any of these keys and/or if any of the keys cannot be verified, the requestor's certificate will not be installed and the requestor may be identified as an imposter or an attacker.

As the secrets or keys are used, the system may provide a return value for each of the keys, which may include the request submitted by the initiating tenant admin. The return value may also be signed by a recovery mechanism (e.g., the voting engine 120) of the access services. This allows the requestor to verify that there is no malicious attempt to gain control over the access services 102 while also confirming the identity of the requestor. When the certificate is installed, the requestor should verify that the installed certificate matches the one that was sent to the initiating tenant admin.

The voting operation is performed gradually in the sense that the keys are gradually revealed at various control points and verified. Further, any permissions granted to the initiating tenant admin are limited in time and authorization. Thus, the tenant admin may be restricted to a specific action (e.g., installing the certificate) and may be required to perform the action within a specified time period.

The voting operation (or reinstatement operation), in one example, may begin when a request is received from the requestor and end when the new certificate is installed and/or confirmed.

If a request from a requestor is received by the tenant admin 124, the tenant admin 124 may invoke the voting engine 120 using, for example, a REST API. The request to initiate the voting operation may include characteristics of the admin 122. For example, the request may include information indicating how the tenant admin 124 verified the identity of the admin 122. The tenant admin 124, for example, may perform an identity test by asking for specific information, receiving information provided by the requestor, or the like. The requestor may provide information to prove their identity in various forms such as an online submission, a telephone call, a message, an email, demonstrating access to a digital asset, or the like. These proofs of identity may be sufficiently convincing to the tenant admin 124 to initiate the voting operation.

In one example, a first key may be required from the requestor prior to initiating the voting operation. This key may be verified by the voting engine to allow the voting operation to begin. If the key is correct or verified, the tenant admin 124 may indicate or provide information that the requestor provided to demonstrate or prove their identity (e.g., a secret word, sent an email, a text, or the like). This may be in addition to the key required by the voting engine.

Once the voting engine receives the key and allows the voting operation to commence, the other tenant admins are notified by the voting engine 120 that they can vote on whether they recognize the requestor being recommended for reinstatement that was included or identified in the request. The tenant admins 124 and 126 may vote on reinstating the requestor and if a threshold consensus is reached (a quorum of yes votes), the requestor, who is believed to be the admin 122, may be restored or reinstated. The consensus may be a percentage of possible or eligible votes. In one example, the threshold is 100%, but the threshold may be less than 100%.

If the voting operation is successful (a yes vote is determined), the initiating tenant admin (tenant admin 124 in this example) may be able required to provide a second secret or key to the voting engine 120. The keys may be provided via the initiating tenant admin. If the second key is verified or confirmed by the voting engine 120, the initiating tenant admin may be granted permissions to perform the operation of adding the new certificate of the requestor, which was previously received from the requestor, to the access services 102 such that the admin 122 regains access to the access services 122.

Prior to installing the new certificate, a third key from the requestor may be required. If the voting engine 120 confirms or verifies the third key, the tenant admin 124 is allowed to install the new certificate, thereby restoring access to the requestor as the admin 122.

Each time a key is provided by the requestor and verified by the voting engine 120, a return value is signed by the voting engine and returned to the requestor. Assuming that the requestor is the admin 122, this allows the requestor to verify the request submitted by the tenant admin. This may prevent a malicious tenant admin from taking actions that are not being authorized.

In one embodiment, the voting engine 120, upon receiving a request from the tenant admin 124 and prior to allowing voting, may ensure that no admin of the access services 102 has basic authentication options enabled and may confirm that no admin user has mTLS certificate-based options available. The tenant admins 124 and 126 may vote by accessing a certain URL, selecting "yes" or "no" on a webpage presented by the voting engine 120, or in other manner. The voting may be achieved using a digital questionnaire or in another manner. The voting engine 120 may collect and tabulate the votes and if the decision to reinstate is affirmative, initiate the installation of the new certificate for the admin 122.

FIG. 1 also illustrates that the applications 116 (and/or services 114) may vote. The voting engine 120 may collect information from the admin 122 that relates to information that may be accessed from, stored by, or relevant to the applications 116 (or services 114). The information collected from the admin 122 can be verified by the applications 116 against information/data of the applications 116. When there is a match for a given application, an affirmative vote may be generated at the voting engine 120. For example, an application may verify information from a user related to logs (e.g., what was the most recent action or set of actions performed by the admin prior to losing access).

In the context of restoring the certificate of or access of the admin 122, the relevant group of voters may be the tenant admins. However, the group of voters for a given operation may depend on the purpose of the vote. For example, the ability of an admin to perform a critical operation may depend on the vote of other equally privileged admins (same level or class of admin). In some examples, applications may also be able to vote.

As previously stated, the voting operation may involve multiple tenant admins and/or applications. These voting entities in the voting operation may have different levels of credibility. To increase the reliability of the voting operations, the votes of the voting entities may be given different weights. The weight of a particular voter (or vote) may be based on seniority, traffic volume, type of authentication, possession of an irrevocable digital asset, or the like or combination thereof. Each of these may increase a vote's weight by a determined factor or by a specified percentage or the like. In addition, the weight or score of the voters may be augmented using a proof-of-stake mechanism. Tenant admins that participate in voting operations, that perform identity tests, or the like may receive a reward. The rewards received by a voter may be a factor or component of the weight of the voter's vote. This allows a vote to be weighted in terms of credibility and reward.

Figure 2:
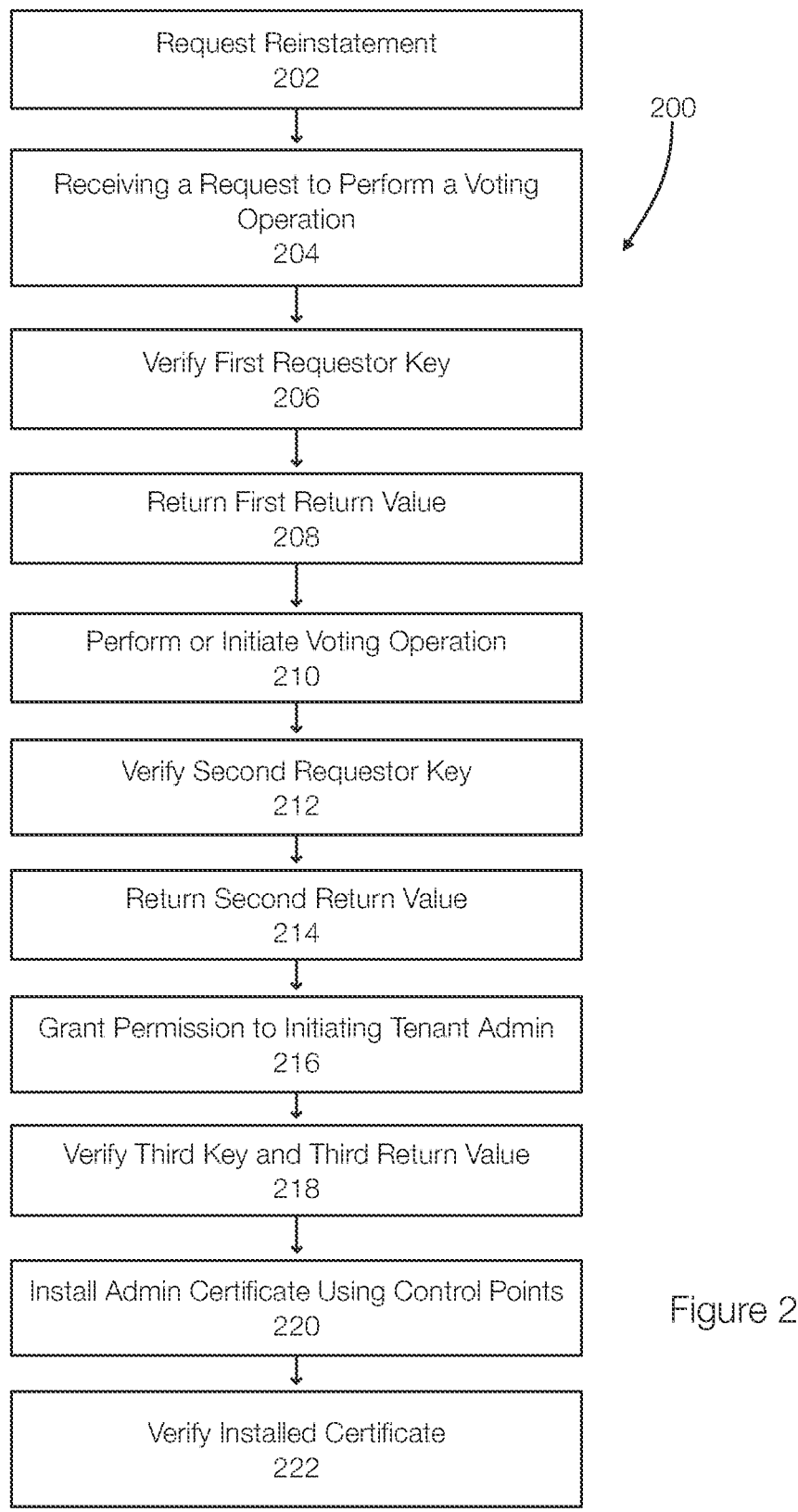
FIG. 2 discloses aspects of reinstating an administrator to a computing system or services such as access services.

FIG. 2 discloses aspects of reinstating an access services admin that has been locked out or prevented from accessing the access services or other computing system. The method 200 may include receiving 202 a reinstatement request. The voting engine subsequently receives 204 a request to perform a voting operation from the initiating tenant admin.

More specifically, in one example, the admin of the access services may discover that their certificate has expired and that they cannot access the access services or perform operations on behalf of or for the benefit of the tenants.

In this example, the admin (or the requestor as their identity cannot be confirmed with a valid certificate) may contact a tenant admin and send 202 a request for reinstatement. The request for reinstatement may be achieved in any manner available to the requestor. The voting engine may also allow the requestor (e.g., locked-out admin) to access an API to request reinstatement. The requestor may be required to identify a specific tenant admin. Identifying information may be collected from the requestor at this time.

In another example, the requestor may send an email to a tenant admin to request reinstatement as the admin. The request for reinstatement may be sent by text, by email, by telephone, or the like. If the tenant admin that receives the request initiates a voting operation, this allows the initiating tenant admin to verify the identity of the requestor by verifying the identity of the requestor, such as by performing an identity test. Receiving a text or email from the requestor, which is an example of an identity test, may be sufficient for the tenant admin to confirm that the admin cannot access the access services and that the admin requesting reinstatement is the actual admin of the access services. In another example, the request from the admin may include a secret word (this secret may be different from the secrets or keys used at control points) that is recognized by the tenant admins. The identity of the requestor can be tested or recognized in other manners.

The request for reinstatement from the requestor may include a new certificate, which cannot be installed or used by the requestor because the requestor is currently locked out of the access services. However, the requestor can generate the new certificate. The request for reinstatement may also include information that can be verified by an application.

Assuming that a tenant admin agrees with the request for reinstatement received from the requestor, the initiating tenant admin may send a request to perform a voting operation, which request is received 204 at the voting engine. At this point, the voting engine may implement a control point. The first control point verifies 206 a first key received from the requestor. The first key may be received by the initiating tenant admin from the requestor and provided to the voting engine. The voting engine may verify or validate the first key and may return 208 a first return value. The first return value may be signed by the voting engine such that the requestor can verify the first return value. In one example, the first return value includes the request submitted by the initiating tenant admin.

If the first key and the first return value are validated or verified, the voting operation is performed or initiated 210. Performing the voting operation includes asking voting entities to register their votes. In the voting operation, the voting entities (the tenant admins and/or applications in this example) may each be provided with a link (e.g., via email) from the voting engine to a web page that allows them to register their vote. The web page may include the information detailing how the identity of the requestor was verified by the tenant admin that initiated the voting operation.

Alternatively, the voting entities or tenant admins may each perform their own identity test. For example, a tenant admin may require additional information from the requestor. In one example, prior to initiating the voting operation, the requestor may be required to provide information relevant to the potential identity tests that may be performed by the tenant admins. The identity test for an application may relate to the application's logs and/or entries in the logs the true admin should be aware of.

As the voting operation is performed, the tenant admins may access a specific URL to register their vote. Before reinstating the requestor as the admin, the voting operation may require a threshold approval level. The threshold level may be any percentage desired by the access services or by the tenants as a whole. The voting operation may be able to complete successfully and authorize or recommend reinstatement as long as a majority of a quorum of the tenant admins vote or if a quorum responds to the voting operation and satisfies a threshold level. In general, any mechanism that allows tenant admins to express their vote on reinstating the admin may be used. Typically, this is performed in a technical manner. Thus, clients may access a web page to automatically cast their digital vote or response to the request for reinstatement.

If the votes indicate that the requestor is to be reinstated as the admin (an affirmative vote), the initiating tenant admin may be required to validate or verify 212 a second key from the requestor. Thus, the second key is received from the requestor and validated or verified 212 by the voting engine. A second return value may be signed and returned 214 for evaluation by the requestor. This allows the requestor to verify the request submitted by the initiating tenant admin.

If the second key is verified and the second return value is also verified, the initiating tenant admin is granted 216 permission to perform an action in the access services. Generally, a tenant admin does not have the permissions or rights to install a certificate for an admin. The voting operation allows this permission to be granted to the tenant admin.

When the tenant admin is ready to actually install the new certificate, a third key is requested and verified 218 by the voting engine. The third return value is also verified. If these verifications are successful, the new certificate is installed 220 by the tenant admin. The requestor, now admitted as the admin, may verify 222 that the correct certificate was installed.

The permissions or privileges granted to the tenant admin may be limited in scope and time. For example, the tenant admin may only be able to perform a specific operation and may be required to perform that operation during a specific time or during a certain time window. Once the new certificate of the admin is installed, access to the access services is restored to the admin and the temporary privileges granted to the tenant admin may be revoked or terminated. Advantageously, instead of performing an arduous process to reinstate the admin, existing users, such as the tenant admins, can quickly validate the entity claiming to be the admin while maintaining required security measures.

Figure 3:
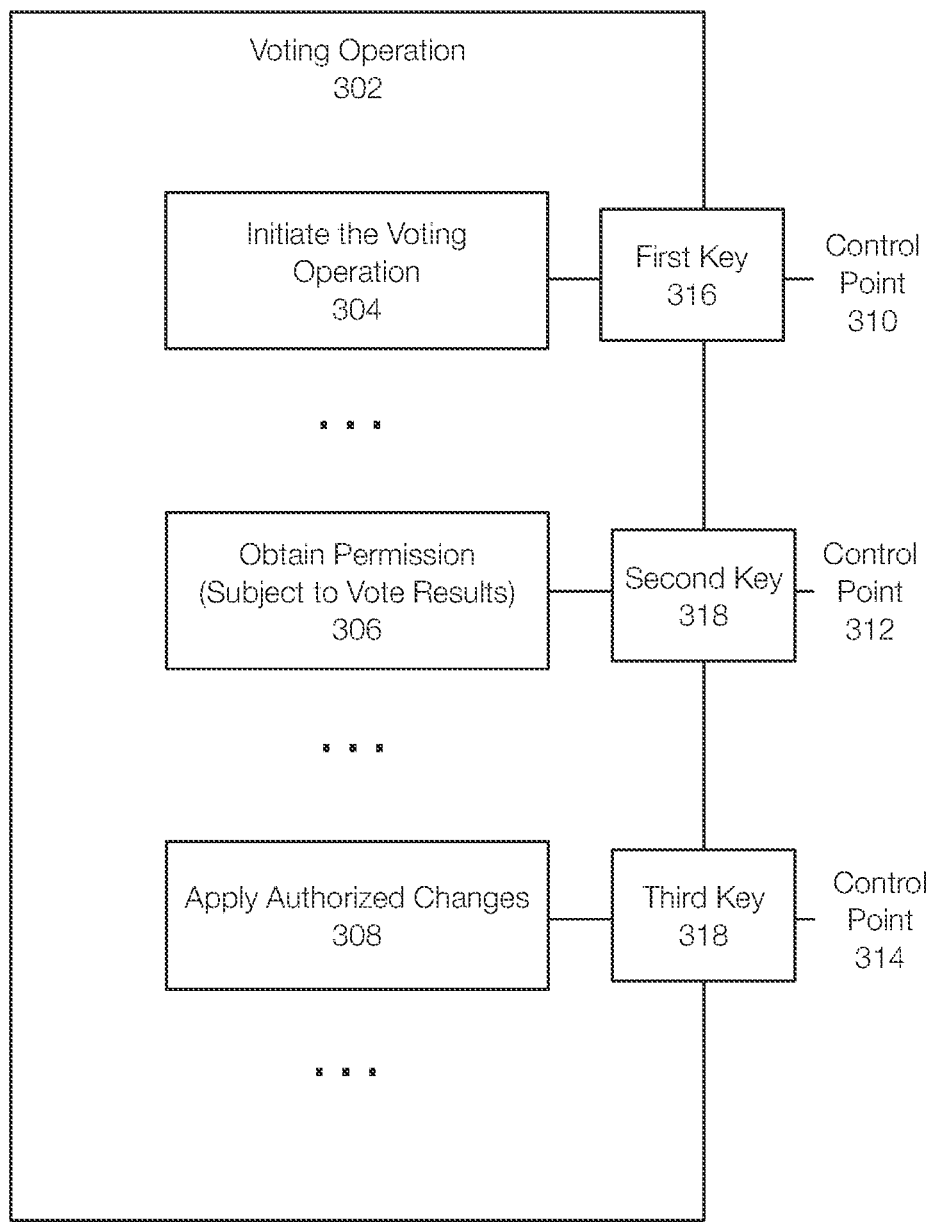
FIG. 3 discloses aspects of a voting operation that is limited in time, limited in authorization, and performed gradually.

FIG. 3 discloses aspects of a voting operation that is limited in time, limited in authorization, and performed gradually. FIG. 3 illustrates a voting operation 302. The voting operation 302 may be performed for the purpose of reinstating a requestor as the admin of a computing system. In this case, the voting operation may involve administrators of different classes or types. In another example, the voting operation may be to authorize an operation requested by an existing admin. In this case, other admins of the same class may vote on whether to allow the requested operation.

In these examples, the voting operation 302 is subject to control points, represented by control points 310, 312, and 314. A control point, by way of example, allows the voting operation 302 to restore access gradually and in a manner that provides additional security. The number of control points may vary. However, in order to perform a gradual recovery, at least two control points are included, but not required.

In this example, the control point 310 includes verifying a first key 316. More specifically, the voting operation requires a requestor to gradually provide a series of keys for verification. In one example, at least two key verifications are required and FIG. 3 illustrates three key verifications at three different control points that are separated in time.

The keys are received by the initiating tenant admin and verified by the voting engine. The voting engine, for each key, provides a return value that can be evaluated and verified by the requestor. For example, the voting engine may sign the return values such that the requestor can verify the source of the return value.

In this example, the first control point 310 is associated with initiating the voting operation 304. If verification fails, the voting operation is terminated and the requestor may be expelled from the computing system.

The second control point 312 may be associated with obtaining permission 306. This is subject to a successful vote to reinstate the requestor as the admin. Thus, the second key 318 and second return value may be verified at the second control point 312. More specifically, the second key, in one example, may not be requested or verified if the vote fails.

The third control point 314 may be associated with applying the authorized change 308 (e.g., installing the certificate). At the third control point 314, the third key 318 and the return value are verified.

Verifying keys may include the voting engine determining whether a key is valid. The voting engine, for example, may store a table of hashes of valid keys. Each of the keys may be associated with a flag. When a key is received, the key may be hashed and compared to the corresponding hash value in the table. At the same time, the flag is set to indicate that the key has been used. If the key is received a second time, or out of sequence, the flag, if set, indicates that the key has been used. This may trigger an action to terminate the voting operation and prevent the requestor from gaining access to the computing system.

In one example, the control points and multiple key verifications occur in the context of a single session. In one example, a single session occurs when the requestor is connected through the entire voting operation. Communications occur over that established communication. The requestor is not permitted to disconnect and reconnect. If disconnection/reconnection occurs, the voting operation must be restarted.

Further, if one of the keys is compromised (e.g., known to an attacker), the compromised key may be submitted or used before the requestor can submit the key. Because the keys expire after a single use, the requestor is able to inform the tenant admin that the key was used in an unauthorized manner. This will terminate the voting operation, which can be restarted. As a result, a single key has little value to an attacker and cannot be used on its own to compromise the computing system (e.g., the access services). Attempts to use a key outside of the single session thus fail.

The control points associated with a voting operation to reinstate a requestor as an admin (or for other purpose) are not limited to those disclosed herein. Control points (any number thereof) can be implemented at different steps or timings of the voting operation other than those discussed herein. Embodiments of the invention ensure that the recovery process is gradual and ensure that the requestor has multiple keys in order to pass the control points of the voting operation. Further, if any of the keys are used out of sequence, outside of the session, or before the requestor (by an attacker), the voting operation stops and may be restarted with a different set of keys. This allows attackers to be detected and thwarted. This also allows the requestor to verify aspects of the voting operation to prevent certain types of attacks, such as man-in-the-middle attacks.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, identity and/or access control operations, reinstatement operations, voting operations, certificate related operations, or the like or combination thereof. More generally, the scope of the invention embraces any operating environment in which the disclosed concepts may be useful.

Example cloud computing environments, which may or may not be public, include storage environments that may provide data protection or data storage functionality for one or more clients. Another example of a cloud computing environment is one in which processing, data protection, and other services may be performed on behalf of one or more clients or tenants. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, replication services, backup servers, restore servers, backup clients, and restore clients, for example, may likewise take the form of software, physical machines, containers, or virtual machines (VMs), though no particular component implementation is required for any embodiment.

Example embodiments of the invention are applicable to any system capable of storing and handling various types of objects, in analog, digital, or other form.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving a request, by a voting entity from a requestor, to perform a voting operation to reinstate the requestor as an admin of a computing system, performing the voting operation, at each control point of the voting operation, verifying a key of the requestor, wherein the voting operation continues only when the key provided by the requestor is verified by a voting engine, when a result of the voting operation to reinstate the requestor as the admin is affirmative and all of the keys provided at the control points were successfully verified, reinstating the requestor as the admin of the computing system.

Embodiment 2. The method of embodiment 1, wherein the control points include at least a first control point and a second control point, wherein the first control point occurs earlier in the voting operation than the second control point.

Embodiment 3. The method of embodiment 1 and/or 2, further comprising verifying a first key at the first control point and returning a first return value to the requestor, wherein the voting operation is terminated if the first key is not successfully verified and/or if the first return value is not verified.

Embodiment 4. The method of embodiment 1, 2, and/or 3, further comprising verifying a second key at the second control point and returning a second return value to the requestor, wherein the voting operation is terminated if the second key is not successfully verified and/or if the second return value is not verified, wherein the second key is different from the first key.

Embodiment 5. The method of embodiment 1, 2, 3, and/or 4, wherein the first return value and the second return value are signed by the voting engine.

Embodiment 6. The method of embodiment 1, 2, 3, 4, and/or 5, wherein the first key and the second key are verified in a single session.

Embodiment 7. The method of embodiment 1, 2, 3, 4, 5, and/or 6, wherein use of the second key before use of the first key terminates the voting operation.

Embodiment 8. The method of embodiment 1, 2, 3, 4, 5, 6, and/or 7, wherein the first key and the second key are single use keys and are invalidated after a single use, wherein use of the first key or the second key out of sequence terminates the voting operation, wherein use of the first key or the second key outside of a single session terminates the voting operation.

Embodiment 9. The method of embodiment 1, 2, 3, 4, 5, 6, 7, and/or 8, further comprising restarting the voting operation if any of the keys are not verified, used out of sequence, or used outside of a single session.

Embodiment 10. The method of embodiment 1, 2, 3, 4, 5, 6, 7, 8, and/or 9, further comprising performing the voting operation by collecting votes from voters, wherein each of the votes are weighted based on one or more of seniority of a voter, traffic volume of the voter, authentication method of the voter, possession of an irrevocable digital asset, and rewards of the voter, wherein the rewards are based on participating in other voting operations.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

Embodiment 13. A system comprising one or more hardware processors configured to perform the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, engine, or agent may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
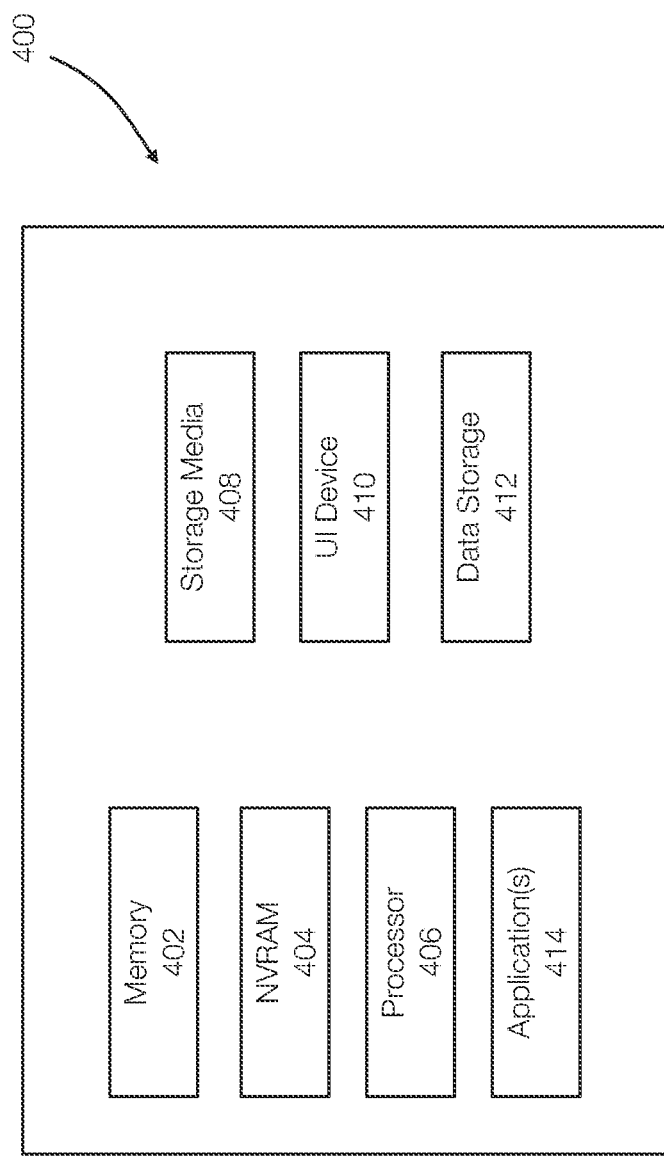
FIG. 4 discloses aspects of a computing device, system, or entity.

With reference briefly now to FIG. 4, any one or more of the entities disclosed, or implied, by the Figures, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4. The device 400 may represent a computing environment, such as the system 100, and may represent a cluster of servers, or the like.

In the example of FIG. 4, the physical computing device 400 includes a memory 402 which may include one, some, or all, of random-access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid-state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving a request, by a voting entity from a requestor, to perform a voting operation to reinstate the requestor as an admin of a computing system;
   performing the voting operation;
   at each control point of the voting operation, verifying a key of the requestor, wherein the voting operation continues only when the key provided by the requestor is verified by a voting engine;
   when a result of the voting operation to reinstate the requestor as the admin is affirmative and all of the keys provided at the control points were successfully verified, reinstating the requestor as the admin of the computing system.

2. The method of claim 1, wherein the control points include at least a first control point and a second control point, wherein the first control point occurs earlier in the voting operation than the second control point.

3. The method of claim 2, further comprising verifying a first key at the first control point and returning a first return value to the requestor, wherein the voting operation is terminated if the first key is not successfully verified and/or if the first return value is not verified.

4. The method of claim 3, further comprising verifying a second key at the second control point and returning a second return value to the requestor, wherein the voting operation is terminated if the second key is not successfully verified and/or if the second return value is not verified, wherein the second key is different from the first key.

5. The method of claim 4, wherein the first return value and the second return value are signed by the voting engine.

6. The method of claim 4, wherein the first key and the second key are verified in a single session.

7. The method of claim 6, wherein use of the second key before use of the first key terminates the voting operation.

8. The method of claim 3, wherein the first key and the second key are single use keys and are invalidated after a single use, wherein use of the first key or the second key out of sequence terminates the voting operation, wherein use of the first key or the second key outside of a single session terminates the voting operation.

9. The method of claim 1, further comprising restarting the voting operation if any of the keys are not verified, used out of sequence, or used outside of a single session.

10. The method of claim 1, further comprising performing the voting operation by collecting votes from voters, wherein each of the votes are weighted based on one or more of seniority of a voter, traffic volume of the voter, authentication method of the voter, possession of an irrevocable digital asset, and rewards of the voter, wherein the rewards are based on participating in other voting operations.

11. A non-transitory storage medium having stored therein instructions that are executable by one or more hardware processors to perform operations comprising:
    receiving a request, by a voting entity from a requestor, to perform a voting operation to reinstate the requestor as an admin of a computing system;
    performing the voting operation;
    at each control point of the voting operation, verifying a key of the requestor, wherein the voting operation continues only when the key provided by the requestor is verified by a voting engine;
    when a result of the voting operation to reinstate the requestor as the admin is affirmative and all of the keys provided at the control points were successfully verified, reinstating the requestor as the admin of the computing system.

12. The non-transitory storage medium of claim 11, wherein the control points include at least a first control point and a second control point, wherein the first control point occurs earlier in the voting operation than the second control point.

13. The non-transitory storage medium of claim 12, further comprising verifying a first key at the first control point and returning a first return value to the requestor, wherein the voting operation is terminated if the first key is not successfully verified and/or if the first return value is not verified.

14. The non-transitory storage medium of claim 13, further comprising verifying a second key at the second control point and returning a second return value to the requestor, wherein the voting operation is terminated if the second key is not successfully verified and/or if the second return value is not verified, wherein the second key is different from the first key.

15. The non-transitory storage medium of claim 14, wherein the first return value and the second return value are signed by the voting engine.

16. The non-transitory storage medium of claim 14, wherein the first key and the second key are verified in a single session.

17. The non-transitory storage medium of claim 16, wherein use of the second key before use of the first key terminates the voting operation.

18. The non-transitory storage medium of claim 13, wherein the first key and the second key are single use keys and are invalidated after a single use, wherein use of the first key or the second key out of sequence terminates the voting operation, wherein use of the first key or the second key outside of a single session terminates the voting operation.

19. The non-transitory storage medium of claim 11, further comprising restarting the voting operation if any of the keys are not verified, used out of sequence, or used outside of a single session.

20. The non-transitory storage medium of claim 11, further comprising performing the voting operation by collecting votes from voters, wherein each of the votes are weighted based on one or more of seniority of a voter, traffic volume of the voter, authentication method of the voter, possession of an irrevocable digital asset, and rewards of the voter, wherein the rewards are based on participating in other voting operations.

* * * * *